Patented Aug. 1, 1933

1,920,166

UNITED STATES PATENT OFFICE 1,920,166

VAT AND SULPHUR DYESTUFF PREPARATION

Hermann Berthold and Hermann Friedrich, Leverkusen-on-the-Rhine, Germany, assignors to General Aniline Works, Inc., New York, N. Y., a Corporation of Delaware No Drawing. Application December 3, 1931, Serial No. 578,847, and in Germany December 6, 1930

8 Claims. (Cl. 8—6.)

The present invention relates to new vat and sulphur dyestuff preparations for textile printing.

In accordance with the invention vat and sulphur dyestuff preparations are produced comprising water soluble salts of the products of the reaction of halogen fatty acids and carbocyclic aromatic hydroxy compounds of the following formula: $R.O.R_1.COOH$ wherein R means a carbocyclic aromatic nucleus and $R_1$ means an aliphatic radical.

The new preparations are employed for the printing or slop-padding of textiles, such as cotton, wool, cellulose acetate silk and the like. They are distinguished by considerable advantages over the preparations hitherto known for the said purpose. Thus, according to the invention pastes can be produced, which, especially when containing in addition glycerine or another similar polyvalent alcohol miscible with water, such as for example, ethylene glycol, diethyleneglycol, thiodiglycol and the like, are of particular stability, do not form deposits or crusts and do not freeze or only freeze at a very low temperature. Furthermore, the preparations containing the compounds specified, when used for printing or slop-padding, ensure in most cases an improved fixing and stronger printings than the corresponding preparations not containing the additions in question. In the present process only such sulphur dyestuffs give good results, which possess an affinity for textile fibres when applied for printing purposes.

The extent of the effect attainable does not only depend on the nature of the dyestuff employed and on the compounds used as additions, but also on the method by which the printing colors are produced from the dyestuff preparations, and on the special methods of printing. The printing methods principally concerned can be divided into two groups:—

1. Process of printing with previous reduction (known process), for example:—40–200 grams of dyestuff (in paste) are pasted with 50 grams of glycerine. 315–350 grams of water, 25–50 grams of caustic soda solution 40° Bé.), 20–40 grams of calcined sodium carbonate and 500–450 grams of a thickening agent, containing in 1000 parts by weight:—280 parts by weight of British gum, 100 parts by weight of starch, 20 parts by weight of the sodium salt of benzyl sulphanilic acid and 600 parts by weight of water, and at 70° C. 40–90 grams of sodium formaldehyde sulphoxylate and 10–40 grams of sodium hydrosulphite are added. With this printing color textile products are printed in the customary manner, the printings are steamed, for example, in a Mather Platt apparatus and developed and finished in the customary manner.

When the above printing colors contain salts of the products of the reaction of carbocyclic aromatic hydroxy compounds and halogen fatty acids, (which products may likewise replace wholly or in part the glycerine or the sodium salt of benzyl sulphanilic acid), there are obtained stronger printings and better fixation than without these materials.

The process of printing with previous reduction is used principally for dyestuffs, which vat with difficulty and when applying the dyestuffs in the form of a powder. Endeavours are however made to replace this process even in the latter cases by process 2 (below).

2. Process of printing without previous reduction. The following is an example of the process:—

A printing color is made up from:—10–20 grams of dyestuff paste, 0–10 grams of water, and 80 grams of a thickening agent, containing in 1000 parts by weight.—170 parts by weight of tragacanth 65:1000, 160 parts by weight of industrial gum 1:1, 60 parts by weight of wheat starch, 150 parts by weight of water, 60 parts by weight of British gum, 100 parts by weight of glycerine, 150 parts by weight of potassium carbonate and 150 parts by weight of sodium formaldehyde sulphoxylate.

Textile products printed with such printing colors are steamed in order to develop the dyestuff, then oxidized and finished in the customary manner.

When the above printing colors contain, for example, the sodium salt of one of the known cresoxy acetic acids of the formula $CH_3C_6H_4O.CH_2.COOH$, the printings in accordance with this process are usually stronger and better fixed than without this addition. Consequently it is possible to print by this latter process also such dyestuffs, as have hitherto given satisfactory results only in the first process. This fact constitutes a considerable technical advance particularly in the avoidance of caustic alkalies, in consequence whereof the fibre is more cautiously treated, furthermore, in the prolonged stability and applicability of the made up printing pastes in consequence of the absence of the readily decomposable hydrosulphite, which is entirely replaced by sodium formaldehyde sulphoxylate.

It should be expressly mentioned that these two main groups of printing methods are likely to be applied with success in most cases, however, modifications of these processes are also applicable.

The addition of the salts of the condensation products of carbocyclic aromatic hydroxy compounds and halogen fatty acids can be carried out at any desired stage of the manufacture of the printing colors, for example:—

(a) The dyestuff, in the form of a pressed cake containing water (12–40% dyestuff content), is stirred with glycerine or some other similar polyhydric water-soluble alcohol and a quantity of the desired compound equal to about 25–100% of the pure dyestuff is added. The most favorable proportions depend largely on the degree of dispersion of the dyestuff. When the dyestuff pastes contain more water than is desired, they can be concentrated, for example, by evaporation.

Thus are obtained uniform, smooth pastes, which do not dry up, do not form encrustations, do not deposit, do not freeze and, even after a prolonged period, can still be worked up to valuable printing colors, especially, when a preserving agent is also added to the pastes.

(b) The dyestuff is finely ground and intimately mixed with the likewise finely ground addition in question. The addition of an emulsifying agent may be of advantage.

(c) The dyestuff in the form of a pressed cake containing water or in the form of an aqueous paste is evaporated to dryness in the presence of the assistant compound to be added and, if desired, in the presence of dextrine or an emulsifying agent.

(d) The dyestuff is reduced in the presence of glycerine or of another similar polyhydric alcohol miscible with water, for example, thiodiglycol, thiodiglycerol or the like with previous, simultaneous or subsequent addition of the new compound to be added.

(e) The direct addition to the printing color of the salts of the products of the reaction of halogen fatty acids with carbocyclic aromatic hydroxy compounds is also capable of improving considerably the printing qualities of the printing color, for example:—72 grams of a thickening containing in 1000 parts by weight:—60 parts by weight of wheat starch, 150 parts by weight of water, 60 parts by weight of British gum, 260 parts by weight of industrial gum 1: 1, 170 parts by weight of tragacanth 65: 1000, 150 parts by weight of potassium carbonate and 150 parts by weight of sodium formaldehyde sulphoxylate are stirred to a printing color with the aqueous dyestuff paste and 4 grams of glycerine and 4 grams of the sodium salt of phenoxy acetic acid.

The dyestuff paste thus made up prints considerably better than a paste produced with the same thickening and 8% of glycerine in the absence of the sodium salt of phenoxy acetic acid.

In all the instances described under (a) to (e) dyestuff preparations are obtained, which either as such possess technical advantages (see, for example, the preparations under (a)), or as contrasted with the same preparations without the addition of the new compounds display improved qualities of printing and fixation.

The amount of the reaction products of carbocyclic aromatic hydroxy compounds with halogen fattty acids to be added may vary within the widest limits. Generally, we prefer to apply about 25–100% by weight of the same, (calculated on the dyestuff present) to get the best results, but smaller or larger amounts are likewise operable.

It may be mentioned that the reaction products in question can be prepared, for example, by reacting with a halogen fatty acid upon a carbocyclic aromatic hydroxy compound in the presence of an acid binding agent, for example, pyridine.

If desired, a further addition of compound of a hydrotropic character can be made to the preparations, or also additions of anthraquinone or derivatives thereof, such as for example, hydroxyanthraquinones, amino-anthraquinones, anthraquinone sulphonic acids or carboxylic acids or also salts or such reduction products of these compounds as still contain oxygen in the meso-position. By these additions the printing qualities of the new preparations are in many instances still further improved.

The term "hydrotropically acting substances" indicates such substances which in aqueous solutions show the capability of dissolving other substances which per se are insoluble or difficultly soluble in water (compare Neuberg, Biochem. Zeitschrift, vol. 76, 1916, pp. 107–176, reported in Chem. Zentralblatt, 1916, pp. 970–971).

It is pointed out that the expression "vat and sulphur dyestuff preparations for textile printing" is intended to include all preparations specified under (a) to (e) and preparations similar thereto, which can find application for printing purposes and contain salts, for example, alkali metal salts (including ammonium salts), of the products of the reaction of halogenated fatty acids and carbocyclic aromatic hydroxy compounds.

The printing methods, which can be used with advantage, have already been considered. The development of the printings can be carried out by the customary processes, for example, in the following manner:—After drying the printed material the same is subjected to the action of moist steam and the dyestuff is developed by means of potassium chromate/acetic acid (2 grams of $K_2Cr_2O_7$ and 5 ccs. of 30% acetic acid in 1 litre of water), followed by soaping at the boil.

The following examples illustrate the invention without limiting it thereto.

*Example 1*

A printing color of 6.6'-diethoxy-2.2'-bis-thionaphthene-indigo, produced in the manner described under (e), and in which the sodium salt of phenoxy acetic acid may be replaced by that of ortho-, meta-, or para-cresoxy acetic acid or derivatives of these acids, yields printings, which fix considerably better and are more vivid and stronger than those obtainable by the corresponding process without the addition of the sodium salts of phenoxy or cresoxy acetic acids.

Also by the methods described under (a) to (d) valuable dyestuff preparations for printing purposes can be obtained with the above dyestuff.

Instead of the sodium salt of phenoxy acetic acid, other water soluble salts of the same, such as the potassium- or ammonium salt may be used.

*Example 2*

The dyestuff of Example 1 can be replaced by that obtainable in accordance with Example 1 of U. S. Patent 888,852 from naphthohydroxythiophen carboxylic acid, or by the dyestuff from 6-methoxy-3-hydroxythionaphthene and 4-methyl-6-bromo-2.3-dihydro-3-keto-thionaphthene-2-(para-dimethylamino)-anile, or by the dyestuff of the following constitution:—

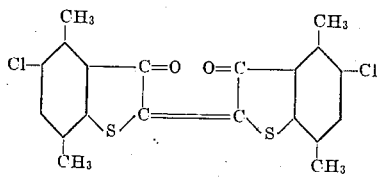

or by the dyestuff referred to in the Colour Index under No. 1101 (Caledon Jade Green), or by the dyestuff obtainable in accordance with the German Patent 242,621 from nitro-methyl-benzanthrone and sulphur, or by 3'.4'-dichloro-1.2-anthraquinoneacridone, or by 6.6'-dichloro-4.4'-dimethylbisthionaphthene indigo, or by the dyestuff obtainable from 4.6-dimethyl-5.7-dichloroisatine with chlorinated alpha-naphthol, or by tetra-bromoindigo, brominated anthanthrones or dichloro-indanthrone.

Other dyestuffs of the anthraquinonoid and indigoid series and also sulphur dyestuffs can be applied with advantage in accordance with the above example.

Furthermore, the sodium salts of the phenoxy or cresoxy acetic acid can be replaced by the salts of other products of the reaction of halogen fatty acids (beta-chloro-propionic acid, chloro-butyric acids or halogen fatty acids with branched or longer chains, such as chloro stearic acid etc.) and other aromatic hydroxy compounds (alpha- or beta-naphthol, chloro-phenols, nitrophenols, halogen-, nitro- or alkyl-naphthols, di- or polyhydroxybenzenes or -naphthalenes, such as resorcin, brenzcatechin, 1.5- or 1.8-dihydroxy-naphthalene, trihydroxybenzenes, hydroxyanthracenes etc.).

Instead of the sodium salts other water soluble salts especially alkali metal salts (which term is intended to include ammonium salts) may obviously be used.

We claim:—

1. Vat and sulphur dyestuff preparations for textile printing comprising a water-soluble salt of an acid of the probable formula: $R.O.R_1COOH$ wherein $R$ means a carbocyclic aromatic nucleus and $R_1$ means an aliphatic radical.

2. Vat and sulphur dyestuff pastes for textile printing comprising a polyvalent alcohol miscible with water and an alkali metal salt of an acid of the probable formula: $R.O.R_1COOH$ wherein $R$ means a carbocyclic aromatic nucleus and $R_1$ means an aliphatic radical.

3. Vat dyestuff preparations for textile printing comprising an alkali metal salt of an acid of the probable formula: $R.O.R_1.COOH$ wherein $R$ means a carbocyclic aromatic nucleus and $R_1$ means an aliphatic radical, in an amount between about 25–100 per cent by weight of the vat dyestuff applied.

4. Vat dyestuff pastes for textile printing comprising a polyvalent alcohol miscible with water and an alkali metal salt of an acid of the probable formula, $R.O.R_1.COOH$ wherein $R$ means a carbocyclic aromatic nucleus and $R_1$ means an aliphatic radical, in an amount between about 25–100 per cent by weight of the vat dyestuff applied.

5. Vat dyestuff pastes for textile printing comprising an alcohol of the group consisting of glycerine and ethylene glycol and an alkali metal salt of an acid of the probable formula: $R.O.R_1.COOH$ wherein $R$ means a carbocyclic aromatic nucleus and $R_1$ means an aliphatic radical, in an amount between about 25–100 per cent by weight of the vat dyestuff applied.

6. Vat dyestuff preparations for textile printing comprising a compound of the group consisting of the alkali metal salts of phenoxy acetic acid and the cresoxy acetic acids.

7. Vat dyestuff pastes for textile printing comprising an alcohol of the group consisting of glycerine and ethyleneglycol and a compound of the group consisting of the alkali metal salts of phenoxy acetic acid and the cresoxy acetic acids in an amount between about 25–100% by weight of the vat dyestuff applied.

8. Vat dyestuff preparation for textile printing comprising the dyestuff of the probable formula:—

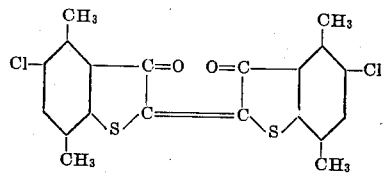

and a compound of the group consisting of alkali metal salts of phenoxy acetic acid and cresoxy acetic acids in an amount between about 25–100% by weight of the vat dyestuff applied.

HERMANN BERTHOLD.
HERMANN FRIEDRICH.